(12) United States Patent
Beck et al.

(10) Patent No.: US 9,441,710 B2
(45) Date of Patent: Sep. 13, 2016

(54) MULTI-SPEED GEARBOX

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 34 days.

(21) Appl. No.: 14/410,700

(22) PCT Filed: May 14, 2013

(86) PCT No.: PCT/EP2013/059876
§ 371 (c)(1),
(2) Date: Dec. 23, 2014

(87) PCT Pub. No.: WO2014/000941
PCT Pub. Date: Jan. 3, 2014

(65) Prior Publication Data
US 2015/0184723 A1    Jul. 2, 2015

(30) Foreign Application Priority Data
Jun. 26, 2012 (DE) .................. 10 2012 210 831

(51) Int. Cl.
*F16H 3/66* (2006.01)
*F16H 3/62* (2006.01)

(52) U.S. Cl.
CPC ....... *F16H 3/666* (2013.01); *F16H 2200/0069* (2013.01); *F16H 2200/2012* (2013.01); *F16H 2200/2046* (2013.01); *F16H 2200/2064* (2013.01); *F16H 2200/2094* (2013.01); *F16H 2200/2097* (2013.01)

(58) Field of Classification Search
CPC .......... F16H 3/666; F16H 2200/2046; F16H 2200/0069; F16H 2200/2028; F16H 2200/2012; F16H 2200/2064; F16H 2200/2094; F16H 3/66; F16H 3/62
See application file for complete search history.

(56) References Cited

U.S. PATENT DOCUMENTS

| 7,018,319 | B2 | 3/2006 | Ziemer |
| 7,695,398 | B2 | 4/2010 | Phillips et al. |
| 7,854,678 | B2 | 12/2010 | Kim |
| 8,303,453 | B2 * | 11/2012 | Wittkopp ................ F16H 3/66 475/276 |
| 8,758,187 | B2 * | 6/2014 | Mellet .................... F16H 3/666 475/280 |

FOREIGN PATENT DOCUMENTS

JP    2006 266389 A    10/2006

OTHER PUBLICATIONS

ZF Friedrichshafen AG, International Patent Application PCT/EP2013/059876/; International Search Report and Written Opinion; dated Jan. 3, 2014.
ZF Friedrichshafen AG, German Patent Application No. DE 2012 10 210831; Search Report; dated Feb. 1, 2013.

* cited by examiner

*Primary Examiner* — Jacob S Scott
*Assistant Examiner* — Tinh Dang
(74) *Attorney, Agent, or Firm* — Dority & Manning, P.A.

(57) ABSTRACT

A multi-speed transmission includes at least four planetary gear sets, eight rotatable shafts and six shifting elements. Selective actuation of the shifting elements brings about different transmission ratio relationships between an input shaft and an output shaft, such that ten forward gears and one reverse gear are able to be realized.

18 Claims, 3 Drawing Sheets

| Gear | Shift Elements | | | | | | Ratio | Gear Step |
|---|---|---|---|---|---|---|---|---|
| | Brake | | Clutch | | | | | |
| | 03 | 04 | 18 | 38 | 45 | 57 | $i$ | $\varphi$ |
| 1 | X | | | X | X | | 5,230 | |
| 2 | X | X | | X | | | 3,429 | 1,525 |
| 3 | | X | | X | X | | 2,282 | 1,503 |
| 4 | | X | | X | | X | 1,760 | 1,297 |
| 5 | | X | X | X | | | 1,298 | 1,358 |
| 6 | | | X | X | X | | 1,000 | 1,296 |
| 7 | | | X | | X | X | 0,850 | 1,176 |
| 8 | | X | X | | X | | 0,697 | 1,220 |
| 9 | X | | X | | X | | 0,615 | 1,133 |
| 10 | X | X | X | | | | 0,579 | 1,062 |
| R | X | | | X | | X | -3,862 | Gesamt 9,033 |

| Z | | | | X | X | X | 1,294 |
|---|---|---|---|---|---|---|---|

| 7.1 | X | | X | | | X | 0,850 |
|---|---|---|---|---|---|---|---|
| 7.2 | | X | X | | | X | 0,850 |
| 7.3 | | | X | X | | X | 0,850 |

Fig. 2

MULTI-SPEED GEARBOX

FIELD OF INVENTION

The present invention relates to a multi-speed transmission of planetary design, in particular an automatic transmission for a motor vehicle.

BACKGROUND

According to the state of the art, automatic transmissions, in particular for motor vehicles, comprise planetary gear sets that are shifted by means of friction elements or shifting elements and are typically connected to a start-up element that is subject to a slip effect and is alternatively provided with a lock-up clutch, such as a hydrodynamic torque converter or a fluid coupling.

In general, automatically shiftable vehicle transmissions of planetary design are subject to continuous development and improvement. Thus, such transmissions should require low construction costs, in particular a small number of shifting elements, and, upon a sequential shifting operation, should avoid double gearshifts, i.e. the switching on and off of two shifting elements, such that, during gearshifts in defined gear groups, only one shifting element is changed. In addition, fuel consumption should be reduced with such transmissions; this may occur, on the one hand, by reducing internal transmission losses and, on the other hand, by operating the internal combustion engine at the ideal operating point. In order to run the internal combustion engine at its ideal operating point, it is particularly important to, with a large gear spread, realize small gear steps, which results in the increase in the number of gears.

DE10 2008 064 113 A1 shows a transmission arrangement of an automatic transmission for a motor vehicle comprising ten forward gears, which features a first planetary transmission, which is designed as a simple planetary transmission, and features a first rotating element, which acts as a fixed element, a second rotating element, which provides a reduced rotation speed, and a third rotating element, which is directly connected to an input shaft and acts as an input element. The known transmission also comprises a second simple planetary gear, which features a fourth rotating element, which is directly connected to the second rotating element, a fifth rotating element, which is optionally connected to a transmission housing by inserting a first brake, and a sixth rotating element, which is optionally connected to a transmission housing by inserting a second brake, whereas a first coupling optionally connects at least two rotating elements of the fourth, fifth and sixth rotating elements. Furthermore, a third planetary transmission composed of one planetary transmission with a single pinion and one planetary transmission with a double pinion is provided; this features a seventh rotating element, which is directly connected to the sixth rotating element, an eighth rotating element, which is optionally connected to the input shaft by inserting a second coupling and is optionally connected to the transmission housing by inserting a third brake, a ninth rotating element, which is connected to an output shaft, and a tenth rotating element, which is connected to the fourth rotating element by inserting a third coupling, whereas a fourth coupling is arranged between the seventh rotating element and the eighth rotating element.

For transmissions with a high number of gears, the problem arises that the number of transmission components and thus the construction costs greatly increase, depending on the number of gears. In addition, due to the higher number of transmission components, the internal efficiency of the transmission decreases, such that the optimization of consumption is partially compensated through the high number of gears.

SUMMARY OF THE INVENTION

The present invention directed to a multi-speed transmission, which features at least ten forward gears and one reverse gear. The multi-speed transmission may have a large spread, for which the construction costs, the component load and the component size are optimized, and which also improves efficiency regarding the drag losses and gearing losses. Additional objectives and advantages of the invention set will be set forth in part in the following description, or may be obvious from the description, or may be learned through practice of the invention.

Accordingly, a multi-speed transmission of planetary design in accordance with an exemplary embodiment of the invention is proposed, which features an input and an output arranged in transmission housing. Furthermore, at least four planetary gear sets, hereafter referred to as the first, second, third and fourth planetary gear sets, eight rotatable shafts—hereinafter referred to as the input shaft, output shaft, third, fourth, fifth, sixth, seventh and eighth shafts—along with six shifting elements preferably designed as multi-disk shifting elements or as positive-locking shifting elements, comprising brakes and clutches, are provided; selective intervening of the shifting elements brings about different transmission ratio relationships between the input and the output, such that, preferably, ten forward gears and one reverse gear are able to be realized.

The first planetary gear set of the transmission is preferably designed as a positive planetary gear set, whereas the second, third, and fourth planetary gear sets of the transmission are preferably formed as negative planetary gear sets.

A simple negative planetary gear set includes a sun gear, a ring gear and a carrier or bar, on which the planetary gears are rotatably mounted, each of which meshes with the sun gear and the ring gear. Thereby, with a bar that is held down, the ring gear exhibits a direction of rotation opposite to the sun gear, and a negative stationary transmission ratio arises. By contrast, a simple positive planetary gear set includes a sun gear, a ring gear and a carrier or bar, on which the inner and outer planetary gears are rotatably mounted, whereas all inner planetary gears mesh with the sun gear, and all outer planetary gears mesh with the ring gear, whereas each inner planetary gear meshes with each outer planetary gear. Thereby, with a bar that is held down, the ring gear exhibits the same direction of rotation as the sun gear, and a positive stationary transmission ratio arises.

In accordance with an exemplary aspect of the invention, the sun gear of the first planetary gear set is connected to the input shaft, which is connected to the sun gear of the third planetary gear set and, through a first clutch, is selectively coupleable or detachably connectable to the eighth shaft connected to the carrier or bar of the fourth planetary gear set, whereas the eighth shaft is selectively coupleable or detachably connectable to the third shaft through a second clutch, which is connected to the carrier or bar of the third planetary gear set and is attachable to the carrier or bar of the first planetary gear set through a first brake, which is coupled to the transmission housing of the transmission.

In addition, the fourth shaft is connected to the sun gear of the second planetary gear set and is attachable to the carrier or bar of the first planetary gear set through a second brake, which is coupled to the transmission housing of the transmission, whereas the seventh shaft is connected to the ring gear of the first planetary gear set and, through a third clutch, is selectively coupleable or detachably connectable to the fifth shaft connected to the ring gear of the second planetary gear set and the sun gear of the fourth planetary gear set.

Furthermore, the sixth shaft is connected to the carrier or bar of the second planetary gear set and the ring gear of the third planetary gear set, whereas the output shaft of the transmission is connected to the ring gear of the fourth planetary gear set.

In accordance with exemplary aspects of the invention, a fourth, fifth or sixth clutch is provided, through the closing of which the second planetary gear set can be blocked.

In accordance with a first exemplary embodiment of the invention, the fourth clutch may be designed as a clutch that selectively couples or detachably connects the sun gear to the ring gear of the second planetary gear set. The fifth clutch may be designed as a clutch that selectively couples or detachably connects the carrier or bar to the sun gear of the second planetary gear set, whereas the sixth clutch may be designed as a clutch that selectively couples or detachably connects the carrier or bar to the ring gear of the second planetary gear set.

The arrangement of the multi-speed transmission in accordance with the exemplary aspects of invention gives rise to transmission ratios particularly suitable for passenger cars along with an increased overall spread of the multi-speed transmission, which results in an improvement in driving comfort and a significant reduction in consumption.

Moreover, with the multi-speed transmission in accordance with the exemplary aspects of invention, construction costs are significantly reduced, due to the low number of shifting elements. In an advantageous manner, with the multi-speed transmission in accordance with the invention, it is possible to perform a start with a hydrodynamic converter, an external starting clutch or other suitable external start-up elements. It is also possible to facilitate the start-up procedure with a start-up element integrated into the transmission. A shifting element that is actuated in the first forward gear and in the reverse gear is preferably suitable.

Furthermore, the multi-speed transmission in accordance with exemplary aspects of the invention gives rise to good efficiency in the main driving gears, based on the low drag losses and gearing losses.

In an advantageous manner, there are low torques on the shifting elements and on the planetary gear sets of the multi-speed transmission, which reduces the load for the multi-speed transmission in an advantageous manner. In addition, the low torques enable correspondingly low dimensioning, which reduces the required installation space and the corresponding costs. Furthermore, there are also low rotational speeds for the shafts, the shifting elements and the planetary gear sets.

In addition, the transmission in accordance with exemplary aspects of the invention is designed in such a manner that adaptability to the various drive train arrangements is enabled, both in the direction of the power flow and in spatial terms. The transmission may be incorporated, for example, in front-cross design, or within the framework of a standard drive.

BRIEF DESCRIPTION OF THE DRAWINGS

In the following, the invention is more specifically illustrated as an example on the basis of the attached figures. The following are represented in these:

FIG. 2: an exemplary circuit diagram for a multi-speed transmission in accordance with FIG. 1;

DETAILED DESCRIPTION

Figure 1:
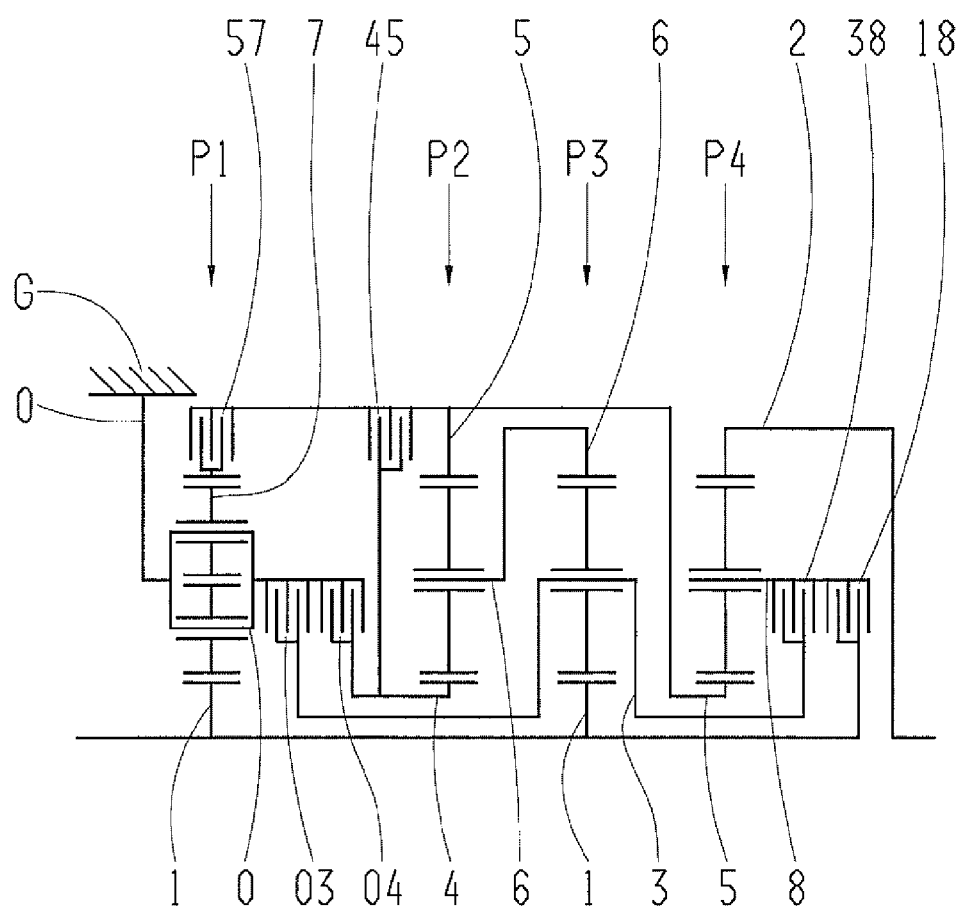
FIG. 1: a schematic view of a preferred exemplary embodiment of a multi-speed transmission in accordance with the invention.

Reference will now be made to embodiments of the invention, one of more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a multi-speed transmission in accordance with an exemplary embodiment of the invention with an input shaft 1, an output shaft 2 and four planetary gear sets P1, P2, P3 and P4, which are arranged in a transmission housing G. In the example shown in FIG. 1, the first planetary gear set P1 is formed as a positive planetary gear set, whereas the second, third and fourth planetary gear sets P2, P3, P4 are formed as negative planetary gear sets. In accordance with the invention, at least one of the negative planetary gear sets P2, P3, P4 may be designed as a positive planetary gear set, if, at the same time, the bar connection and the ring gear connection are exchanged, and the amount of the stationary transmission ratio is increased by one compared to the design as a negative planetary gear set.

With the exemplary embodiment that is shown, the planetary gear sets P1, P2, P3, P4 are arranged, viewed axially, in the order of the first planetary gear set P1, the second planetary gear set P2, the third planetary gear set P3, the fourth planetary gear set P4. In accordance with exemplary aspects of the invention, the axial order of the individual planetary gear sets and the arrangement of the shifting elements are freely selectable, as long as this allows for the binding ability of the elements.

As shown in FIG. 1, six elements, namely two brakes 03, 04 and four clutches or couplings 18, 38, 45, 57 are provided. The spatial arrangement of the shifting elements may be arbitrary, and is limited only by the dimensions and the external shaping. The clutches and brakes of the transmission are preferably designed as frictional shifting elements or multi-disk shifting elements, but may also be designed as positive-locking shifting elements.

With these shifting elements, a selective shifting of at least ten forward gears and one reverse gear can be realized. The multi-speed transmission in accordance with exemplary aspects of the invention features a total of eight rotatable shafts, namely the shafts 1, 2, 3, 4, 5, 6, 7 and 8, whereas the input shaft forms the first shaft 1 and the output shaft forms the second shaft 2 of the transmission.

In accordance with exemplary aspects of the invention, with the multi-speed transmission in accordance with FIG. 1, it is provided that the sun gear of the first planetary gear set P1 is connected to the input shaft 1, which is connected to the sun gear of the third planetary gear set P3 and, through a first clutch 18, is selectively coupleable or detachably connectable to the eighth shaft 8 connected to the carrier or bar of the fourth planetary gear set P4, whereas the eighth shaft 8 is selectively coupleable or detachably connectable to the third shaft 3 through a second clutch 38, which is connected to the carrier or bar of the third planetary gear set P3 and is attachable to the carrier or bar of the first planetary gear set P1 through a first brake 03, which is coupled to the transmission housing G of the transmission (shaft 0).

In addition, with the exemplary embodiment that is shown, the second clutch 38 is particularly suitable for a design as a claw shifting element, by which consumption is significantly improved.

With reference to FIG. 1, the fourth shaft 4 is connected to the sun gear of the second planetary gear set P2 and is attachable to the carrier or bar of the first planetary gear set P1 through a second brake 04, which is coupled to the transmission housing G, whereas the seventh shaft 7 is connected to the ring gear of the first planetary gear set P1 and, through a third clutch 57, is selectively coupleable or detachably connectable to the fifth shaft 5 connected to the ring gear of the second planetary gear set P2 and the sun gear of the fourth planetary gear set P4.

Viewed axially, the first and second brakes 03, 04 are preferably arranged next to each other and may feature a common outer multi-disk carrier designed as multi-disk shifting elements.

The sixth shaft 6 is connected to the carrier or bar of the second planetary gear set P2 and the ring gear of the third planetary gear set P3, whereas the output shaft 2 is connected to the ring gear of the fourth planetary gear set P4.

With the example shown in FIG. 1, a fourth clutch 45 is provided; this couples or connects the fourth shaft 4 to the fifth shaft 5 selectively or detachably from each other, through the closing of which the second planetary gear set P2 can be blocked.

Figure 3:
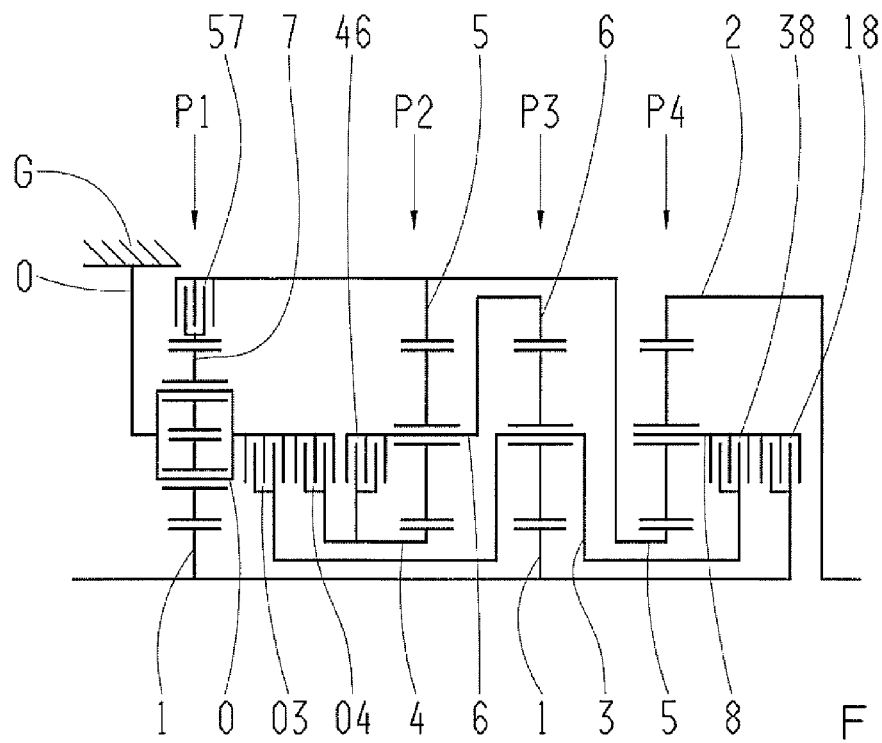
FIG. 3: a schematic view of a second preferred exemplary embodiment of a multi-speed transmission in accordance with the invention.

Alternatively and with reference to FIG. 3, the second planetary gear set P2 may be blocked by locking a fifth clutch 46, which selectively couples or detachably connects the carrier or bar to the sun gear of the second planetary gear set P2, whereas the fourth clutch 45 is omitted. The fifth clutch 46 couples or connects the fourth shaft 4 to the sixth shaft 6 selectively or detachably from each other.

Within the framework of an additional exemplary embodiment of the invention, starting from the embodiment under FIG. 1, the fourth clutch 45 may be omitted, whereas a sixth clutch 56 is provided, through the closing of which the second planetary gear set P2 can be blocked. This design is the subject of FIG. 4. The sixth clutch 56 couples or connects the fifth shaft 5 to the sixth shaft 6 selectively or detachably from each other, by which the carrier or bar of the second planetary gear set P2 is selectively couples or detachably connectable to the ring gear of the second planetary gear set P2.

FIG. 2 shows an exemplary circuit diagram of a multi-speed transmission in accordance with FIG. 1. For each gear, three shifting elements are closed. As an example, the respective transmission ratios i of the individual gears and the gear steps or progressive steps, to be determined from these, for the next higher gear can be seen in the circuit diagram, whereas the value 9.033 represents the spread of transmission.

For the example shown, the values for the stationary transmission ratios of the first, second, third and fourth planetary gear sets P1, P2, P3, P4 are 1.68, −1.91, −2.28 and −2.30, respectively. FIG. 2 shows that, upon a sequential shifting operation, only one shifting element must be switched on, and only one shifting element must be switched off, since two adjacent gears jointly use two shifting elements. It also shows that a large spread is achieved with small gear steps.

The first forward gear arises from the locking of the first brake 03 and the second and fourth clutches 38, 45, the second forward gear arises from the locking of the first and second brakes 03, 04 and the second clutch 38, the third forward gear arises from the locking of the second brake 04 and the second and fourth clutches 38, 45, the fourth forward gear arises from the locking of the second brake 04 and the second and third clutches 38, 57, the fifth forward gear arises from the locking of the second brake 04 and the first and second clutches 18, 38, the sixth forward gear, which in the example shown is designed as a direct gear, arises from the locking of the first, second and fourth clutches 18, 38, 45, the seventh forward gear arises from the locking of the first, third and fourth clutches 18, 57, 45, the eighth forward gear arises from the locking of the second brake 04 and the first and fourth clutches 18, 45, the ninth forward gear arises from the locking of the first brake 03 and the first and fourth clutches 18, 45 and the tenth forward gear arises from the locking of the first and second brakes 03, 04 and the first clutch 18, whereas the reverse gear arises from the locking of the first brake 03 and the second and third clutches 38, 57.

Alternatively, the seventh forward gear can be shifted by additional shifting combinations, which in FIG. 2 are designated with 7.1, 7.2 and 7.3. Accordingly, the seventh forward gear may arise from the locking of the first brake 03 and the first and third clutches 18, 57 or from the locking of the second brake 04 and the first and third clutches 18, 57 or from the locking of the first, second and third clutches 18, 38, 57.

With reference to FIG. 2, as an addition to the ten forward gears, an additional forward gear Z may be realized through the locking of the second, third and fourth clutches 38, 57, 45; the transmission ratio of this is between the transmission ratios of the fifth and sixth forward gears.

By the fact that, in the first forward gear and in the reverse gear, the first brake 03 and the second clutch 38 are closed, these shifting elements may be used as start-up elements.

In the event that, in accordance with the embodiment under FIG. 3, the fourth clutch 45 is replaced by the fifth clutch 46, in the circuit diagram under FIG. 2, the fourth clutch 45 is replaced by the fifth clutch 46.

Figure 4:
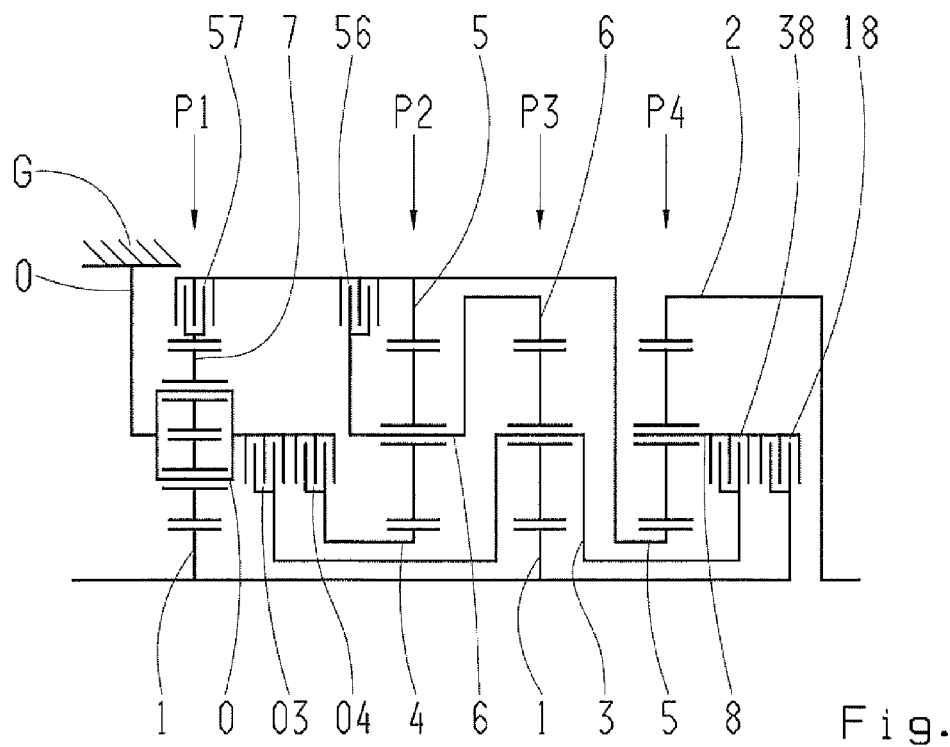
FIG. 4: a schematic view of a third preferred exemplary embodiment of a multi-speed transmission in accordance with the invention.

As an analogy to this, in the event that, in accordance with the embodiment under FIG. 4, the fourth clutch 45 is replaced by the sixth clutch 56, in the circuit diagram under FIG. 2, the fourth clutch 45 is replaced by the sixth clutch 56.

In accordance with the invention, even with the same transmission scheme, different gear steps arise depending on the shifting logic, such that an application-specific or vehicle-specific variation is enabled.

In accordance with the invention, it is also optionally possible to provide additional freewheels at each suitable location of the multi-speed transmission, for example between one shaft and the transmission housing, or, if applicable, in order to connect two shafts.

An axle differential and/or a distributor differential may be arranged on the input side or on the output side.

Within the framework of an advantageous additional exemplary form of the invention, if necessary, the input shaft 1 may be separated from the drive motor by a coupling element, whereas a hydrodynamic converter, a hydraulic clutch, a dry starting clutch, a wet starting clutch, a magnetic powder clutch or a centrifugal clutch may be used as the coupling element. It is also possible to arrange such a starting element in the direction of the power flow behind the transmission, whereas, in this case, the input shaft 1 is constantly connected to the crankshaft of the drive motor.

The multi-speed transmission in accordance with the invention also allows for the arrangement of a torsional vibration damper between the drive motor and the transmission.

Within the framework of an additional exemplary embodiment of the invention that is not shown, a wear-free brake, such as a hydraulic retarder or an electric retarder or the like, may be arranged at each shaft, preferably at the input shaft 1 or the output shaft 2; this is of particular importance for use in commercial vehicles. Furthermore, a power take-off may be provided for the drive of additional power units at each shaft, preferably at the input shaft 1 or the output shaft 2.

The frictional shifting elements that are used may be formed as power-shiftable clutches or brakes. In particular, force-fitting couplings or brakes, such as multi-disk clutches, band brakes and/or cone couplings, may be used.

An additional advantage of the multi-speed transmission presented here is that an electric motor can be installed at each shaft as a generator and/or as an additional drive motor.

Modifications and variations can be made to the embodiments illustrated or described herein without departing from the scope and spirit of the invention as set forth in the appended claims.

REFERENCE SIGNS

0 Shaft
1 First shaft, input shaft
2 Second shaft, output shaft
3 Third shaft
4 Fourth shaft
5 Fifth shaft
6 Sixth shaft
7 Seventh shaft
8 Eighth shaft
03 First brake
04 Second brake
18 First clutch
38 Second clutch
45 Fourth clutch
46 Fifth clutch
56 Sixth clutch
57 Third clutch
G Transmission housing
P1 First planetary gear set
P2 Second planetary gear set
P3 Third planetary gear set
P4 Fourth planetary gear set
i Transmission ratio
φ Progressive step

The invention claimed is:

1. An automatic transmission, comprising:
a transmission housing;
a plurality of planetary gear sets having a first planetary gear set, a second planetary gear set, a third planetary gear set and a fourth planetary gear set, a carrier of the first planetary gear set connected to the transmission housing;
a plurality of rotatable shafts having an input shaft, an output shaft, a third shaft, a fourth shaft, a fifth shaft, a sixth shaft, a seventh shaft and an eight shaft, the input shaft connected to a sun gear of the first planetary gear set and a sun gear of the third planetary gear set, the output shaft connected to a ring gear of the fourth planetary gear set, the third shaft connected to a carrier of the third planetary gear set, the fourth shaft connected to a sun gear of the second planetary gear set, the fifth shaft connected to a ring gear of the second planetary gear set and a sun gear of the fourth planetary gear set, the sixth shaft connected to a carrier of the second planetary gear set and a ring gear of the third planetary gear set, the seventh shaft connected to a ring gear of the first planetary gear set, the eight shaft connected to a carrier of the fourth planetary gear set; and
a plurality of shifting elements having a first brake, a second brake, a first clutch, a second clutch, a third clutch and a fourth clutch, the first brake configured for selectively coupling the third shaft to the carrier of the first planetary gear set, the second brake configured for selectively coupling the fourth shaft to the carrier of the first planetary gear set, the first clutch configured for selectively coupling the input shaft to the eighth shaft, the second clutch configured for selectively coupling the third shaft to the eighth shaft, the third clutch configured for selectively coupling the fifth shaft to the seventh shaft, the fourth clutch configured for selectively blocking the second planetary gear set.

2. The automatic transmission of claim 1, wherein the fourth clutch is configured for selectively coupling the sun gear of the second planetary gear set to the ring gear of the second planetary gear set.

3. The automatic transmission of claim 1, wherein the fourth clutch is configured for selectively coupling the sun gear of the second planetary gear set to the carrier of the second planetary gear set.

4. The automatic transmission of claim 1, wherein the fourth clutch is configured for selectively coupling the carrier of the second planetary gear set to the ring gear of the second planetary gear set.

5. The automatic transmission of claim 1, wherein the first planetary gear set is a positive planetary gear set and the second, third and fourth planetary gear sets are negative planetary gear sets.

6. The automatic transmission of claim 1, wherein the first planetary gear set, the second planetary gear set, the third planetary gear set and the fourth planetary gear set are arranged axially within the transmission housing in a sequence corresponding to the first planetary gear set, the second planetary gear set, the third planetary gear set and the fourth planetary gear set.

7. The automatic transmission of claim 1, wherein the second brake is a positive-locking shift element.

8. The automatic transmission of claim 1, wherein the first brake, the first clutch, the second clutch, the third clutch and the fourth clutch are each multi-disc friction shifting elements.

9. The automatic transmission of claim 1, wherein the automatic transmission has at least ten forward gears and one reverse gear, the first brake and the second and fourth clutches closed in a first forward gear of the ten forward gears, the first and second brakes and the second clutch closed in a second forward gear of the ten forward gears, the second brake and the second and fourth clutches closed in a third forward gear of the ten forward gears, the second brake and the second and third clutches closed in a fourth forward gear of the ten forward gears, the second brake and the first and second clutches closed in a fifth forward gear of the ten forward gears, the first, second and fourth clutches closed in a sixth forward gear of the ten forward gears, the first, third and fourth clutches closed in a seventh forward gear of the ten forward gears, the second brake and the first and fourth clutches closed in a eighth forward gear of the ten forward gears, the first brake and the first and fourth clutches closed in a ninth forward gear of the ten forward gears, the first and second brakes and the first clutch closed in a tenth forward gear of the ten forward gears.

10. An automatic transmission, comprising:
a transmission housing;
a plurality of rotatable shafts positioned within the transmission housing, the plurality of rotatable shafts including an input shaft, an output shaft, a third shaft, a fourth shaft, a fifth shaft, a sixth shaft, a seventh shaft and an eight shaft;
a plurality of planetary gear sets positioned within the transmission housing, the plurality of planetary gear sets including a first planetary gear set, a second planetary gear set, a third planetary gear set and a fourth planetary gear set,
a carrier of the first planetary gear set connected to the transmission housing;
a sun gear of the first planetary gear set and the sun gear of the third planetary gear set coupled to the input shaft,
a ring gear of the fourth planetary gear set coupled to the output shaft,
a carrier of the third planetary gear set coupled to the third shaft,
a sun gear of the second planetary gear set coupled to the fourth shaft,
a ring gear of the second planetary gear set and a sun gear of the fourth planetary gear set coupled to the fifth shaft,
a carrier of the second planetary gear set and a ring gear of the third planetary gear set coupled to the sixth shaft,
a ring gear of the first planetary gear set coupled to the seventh shaft, and
a carrier of the fourth planetary gear set coupled to the eighth shaft; and a plurality of shifting elements positioned within the transmission housing, the plurality of shifting elements including a first brake, a second brake, a first clutch, a second clutch, a third clutch and a fourth clutch,
the first brake configured such that the third shaft is coupleable to the carrier of the first planetary gear set with the first brake,
the second brake configured such that the fourth shaft is coupleable to the carrier of the first planetary gear set with the second brake,
the first clutch configured such that the input shaft is coupleable to the eighth shaft with the first clutch,
the second clutch configured such that the third shaft is coupleable to the eighth shaft with the second clutch,
the third clutch configured such that the fifth shaft is coupleable to the seventh shaft with the third clutch, and
the fourth clutch configured such that the second planetary gear set is blockable with the fourth clutch.

11. The automatic transmission of claim 10, wherein the fourth clutch configured such that the sun gear of the second planetary gear set is coupleable to the ring gear of the second planetary gear set with the fourth clutch.

12. The automatic transmission of claim 10, wherein the fourth clutch configured such that the sun gear of the second planetary gear set is coupleable to the carrier of the second planetary gear set with the fourth clutch.

13. The automatic transmission of claim 10, wherein the fourth clutch configured such that the carrier of the second planetary gear set is coupleable to the ring gear of the second planetary gear set with the fourth clutch.

14. The automatic transmission of claim 10, wherein the first planetary gear set is a positive planetary gear set and the second, third and fourth planetary gear sets are negative planetary gear sets.

15. The automatic transmission of claim 10, wherein the first planetary gear set, the second planetary gear set, the third planetary gear set and the fourth planetary gear set are arranged axially within the transmission housing in a sequence corresponding to the first planetary gear set, the second planetary gear set, the third planetary gear set and the fourth planetary gear set.

16. The automatic transmission of claim 10, wherein the second brake is a positive-locking shifting element.

17. The automatic transmission of claim 10, wherein the first brake, the first clutch, the second clutch, the third clutch and the fourth clutch are each multi-disc friction shifting elements.

18. The automatic transmission of claim 10, wherein the automatic transmission has at least ten forward gears and one reverse gear, the first brake and the second and fourth clutches closed in a first forward gear of the ten forward gears, the first and second brakes and the second clutch closed in a second forward gear of the ten forward gears, the second brake and the second and fourth clutches closed in a third forward gear of the ten forward gears, the second brake and the second and third clutches closed in a fourth forward gear of the ten forward gears, the second brake and the first and second clutches closed in a fifth forward gear of the ten forward gears, the first, second and fourth clutches closed in a sixth forward gear of the ten forward gears, the first, third and fourth clutches closed in a seventh forward gear of the ten forward gears, the second brake and the first and fourth clutches closed in a eighth forward gear of the ten forward gears, the first brake and the first and fourth clutches closed in a ninth forward gear of the ten forward gears, the first and second brakes and the first clutch closed in a tenth forward gear of the ten forward gears.

* * * * *